(12) United States Patent
Sato et al.

(10) Patent No.: US 8,558,949 B2
(45) Date of Patent: Oct. 15, 2013

(54) IMAGE PROCESSING DEVICE, IMAGE PROCESSING METHOD, AND IMAGE PROCESSING PROGRAM

(75) Inventors: Shogo Sato, Tokyo (JP); Kenichi Sanpei, Chiba (JP); Takashi Tsujimura, Kanagawa (JP); Akira Tokuse, Tokyo (JP); Yoko Fukata, Tokyo (JP); Tadasuke Murakami, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/424,590

(22) Filed: Mar. 20, 2012

(65) Prior Publication Data

US 2012/0249810 A1 Oct. 4, 2012

(30) Foreign Application Priority Data

Mar. 31, 2011 (JP) ................................. 2011-080040
Jan. 6, 2012 (JP) ................................. 2012-001037

(51) Int. Cl.
*H04N 7/01* (2006.01)
*H04N 5/225* (2006.01)
*G06K 9/34* (2006.01)

(52) U.S. Cl.
USPC ........... 348/441; 348/169; 348/182; 348/453; 382/164; 382/171; 345/591; 345/604

(58) Field of Classification Search
USPC .................. 348/169–172, 441; 382/162–173
See application file for complete search history.

(56) References Cited

U.S. PATENT DOCUMENTS

| | | | |
|---|---|---|---|
| 5,574,498 A | 11/1996 | Sakamoto et al. | |
| 6,754,382 B1* | 6/2004 | Borg | 382/165 |
| 7,129,980 B1* | 10/2006 | Ashida | 348/333.04 |
| 2002/0176001 A1 | 11/2002 | Trajkovic | |
| 2008/0187217 A1* | 8/2008 | Okutsu et al. | 382/165 |

FOREIGN PATENT DOCUMENTS

| | | |
|---|---|---|
| JP | 07-095598 A | 4/1995 |
| JP | 9-181953 A | 7/1997 |
| JP | 2004-531823 A | 10/2004 |

* cited by examiner

*Primary Examiner* — Roberto Velez
*Assistant Examiner* — Quan Pham
(74) *Attorney, Agent, or Firm* — Lerner, David, Littenberg, Krumholz & Mentlik, LLP

(57) ABSTRACT

An image processing device including: a color space selection unit that selects a color space based on designated color information; and a region specifying unit that specifies a region that includes a color that matches the color that is shown by the color information designated in the color space from a color region specified image that is provided for color region specification.

11 Claims, 12 Drawing Sheets

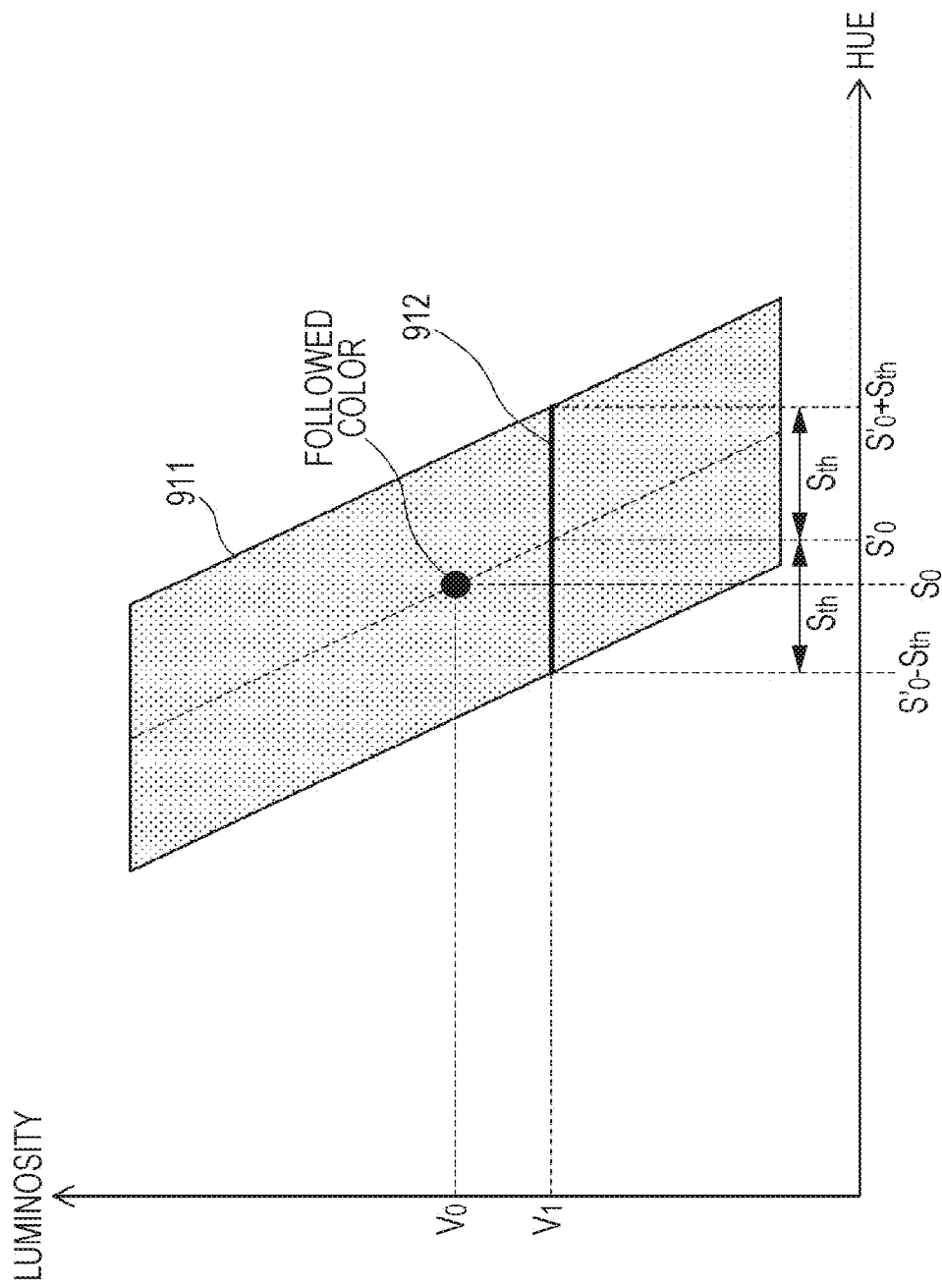

IMAGE PROCESSING DEVICE, IMAGE PROCESSING METHOD, AND IMAGE PROCESSING PROGRAM

CROSS-REFERENCE TO RELATED APPLICATION

The present application claims priority from Japanese Patent Application Nos. JP 2011-080040, filed in the Japanese Patent Office on Mar. 31, 2011, and JP 2012-001037, filed in the Japanese Patent Office on Jan. 6, 2012, the entire contents of both are incorporated herein by reference.

BACKGROUND

The present technology relates to an image processing device, an image processing method, and an image processing program.

In the related art, image capturing devices such as digital still cameras and digital video cameras include a function of automatically tracking a subject when capturing a moving subject and performing autofocus, composition adjustment, exposure adjustment, panning and tilting actions of the image capturing device itself, and the like.

Such a tracking function is performed by a method of detecting movement in a region as the tracking target by, for example, block matching. Further, a histogram method that focuses attention on the hue information and the luminosity information of the captured image that is obtained by capturing and finds the tracking target from the input images using such information is also common (Japanese Unexamined Patent Application Publication No. 9-181953).

SUMMARY

The automatic tracking device described in Japanese Unexamined Patent Application Publication No. 9-181953 seeks to improve the tracking function when the illuminance changes by focusing attention on the hue of the HSV color space at all times. However, low-saturation colors have a characteristic that the hue changes greatly from small changes in the illuminance during capturing. Due to such a characteristic, there is a problem that it becomes difficult to accurately track the hue of the region as the tracking target, and the tracking performance decreases.

Therefore, in a case when the color of the region as the tracking target changes during capturing due to a change in the illumination condition or the capturing environment such as, for example, in a case when the tracking target suddenly moves from a light location to a dark location (such as in the shade), the difference in the color of the tracking target and the color of the tracking target during tracking target designation becomes large, and it becomes difficult to perform tracking with high precision.

It is desirable to provide an image processing device that is able to perform region specification with high precision based on the color characteristics of the image by selecting a color space, an image processing method, and an image processing program.

An image processing device according to an embodiment of the present technology includes: a color information obtaining unit that obtains the color information of a designated region that is designated in a first image; a color space selection unit that selects a color space for evaluating a predetermined region of a second image based on the color information that is obtained by the color information obtaining unit; and a region specifying unit that specifies a predetermined region from the second image based on the color space that is selected by the color space selection unit and the color information.

Further, an image processing method according to another embodiment of the present technology includes: obtaining the color information of a specified region that is specified in the first image; selecting the color space for evaluating a predetermined region of the second image based on the color information; and specifying a predetermined region from the second image based on the selected color space and the color information.

Furthermore, an image processing program according to still another embodiment of the present technology causes a computer to execute an image processing method, the method including: obtaining the color information of a specified region that is specified in the first image; selecting the color space for evaluating a predetermined region of the second image based on the color information; and selecting a predetermined region from the second image based on the selected color space and the color information.

In addition, a capturing device according to still another embodiment of the present technology includes: a capturing unit that receives light via an optical system and generates an image; a region designating unit that performs designation of a region of an image; a color information obtaining unit that obtains the color information of the designated region of the first image which is designated; a color space selection unit that selects a color space for evaluating a predetermined region of the second image based on the color information that is selected by the color information obtaining unit; and a region specifying unit that specifies a predetermined region from the second image based on the color space that is selected by the color space selection unit and the color information.

According to the embodiments of the present technology, even if there is a change in the capturing environment during capturing, it is possible to perform specifying of the region based on the color characteristics in the image with high precision.

BRIEF DESCRIPTION OF THE DRAWINGS

FIG. 9 is a diagram for describing the relationship between the luminosity and the saturation in the region specifying process;

DETAILED DESCRIPTION OF EMBODIMENTS

The embodiments of the present technology will be described below with reference to the drawings. However, the present technology is not limited to the embodiments below. Here, description will be given in the following order.

<1. Embodiments>
  [1-1. Configuration of Image Processing Device]
  [1-2. Overall Flow of Image Processing]
  [1-3. Color Space Selection Process]
  [1-4. Region Specifying Process]
  [1-5. Configuration of Capturing Device Including Image Processing Device]
<2. Modifications>

1. <Embodiments>

[1-1. Configuration of Image Processing Device]

Figure 1:
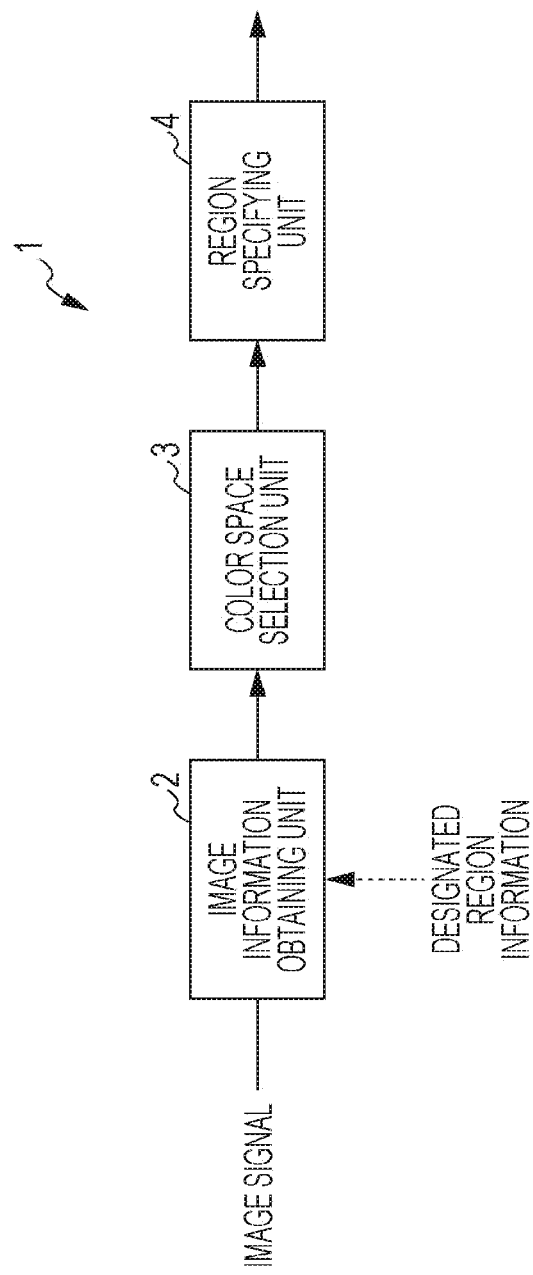
FIG. 1 is a block diagram that illustrates the configuration of an image processing device according to an embodiment of the present technology.

FIG. 1 is a block diagram that illustrates the configuration of an image processing device 1 according to an embodiment of the present technology. The image processing device 1 is installed on a capturing device such as a digital still camera, for example, and is used for tracking control in automatically tracking a subject and the like.

The image processing device 1 is realized by a predetermined program being executed by a control unit configured, for example, by a CPU (Central Processing Unit), a RAM (Random Access Memory), and a ROM (Read Only Memory). A program that is read and activated by the CPU and the like are stored in the CPU. The Ram is used as the working memory of the CPU. The CPU functions as an image information obtaining unit 2, a color space selection unit 3, and a region specifying unit 4 by executing various processes according to the program stored in the ROM and issuing commands.

However, the image processing device 1 may not only be realized by a program but may also be realized as a dedicated device in which hardware that includes the respective functions of the image information obtaining unit 2, the color space selection unit 3, and the region specifying unit 4 is combined.

An image signal of an RGB format, for example, is input to the image information obtaining unit 2 from the outside. In a case when the image processing device 1 is installed on a capturing device, an image signal that is obtained by capturing with the capturing device is input. Further, information of a designated region that indicates a region within the image that relates to the image signal which is arbitrarily designated (hereinafter referred to as the designated region) is input to the image information obtaining unit 2.

Furthermore, the image information obtaining unit 2 obtains the color (hereinafter referred to as the color information) of the designated region of the input image. The color information may be, for example, the values of the luminosity signal and the color difference signal obtained from an RGB format image signal. Further, in a case when an RGB format image signal is input, the color information may be obtained using the average value of R pixels, the average value of G pixels, and the average value of B pixels. Further, the color information may be obtained based on the RGB value of a single pixel in the designated region. The obtained color information is supplied to the color space selection unit 3 along with the input image. The image processing device 1 performs a process of specifying a region that includes the same color as a color according to the color information of the designated region (hereinafter referred to as the same color region) within images that are input after the image in which the designation of the designated region is performed (color region designated image provided for color region specification). Here, although performing a process of specifying the region from the images that are input after the image in which the designation of the designated region is described, without limiting thereto, a process of specifying the region by designating the designated region based on an arbitrary image and specifying another arbitrary image may be performed. Further, a color that is selected by the user on a GUI or the like may be obtained as the color information. In such a case, the color region designated image becomes unimportant.

Further, the image information obtaining unit 2 also performs obtaining of color histograms and obtaining of the color of the entire image by performing wave detection of the designated region and the entire image. Furthermore, the image information obtaining unit 2 also performs obtaining of the size, the position, the moving vectors, and the like (hereinafter, such information is referred to as associated information) of the designated region within the entire region of the image. The associated information is also supplied to the color space selection unit 3 along with the image signal. The associated information is used when one of a plurality of candidates for the same color region is selected by the region specifying unit 4 described later. However, obtaining of the associated information is not an important process, and the associated information may be obtained only in a case when the image processing device 1 has a configuration that uses the associated information.

Designation of the designated image is performed by an input unit of a capturing device on which the image processing device 1 is installed, an external input device that is connected to the image processing device 1, and the like. For example, in a case when the image processing device 1 is installed on a capturing device that includes a touch screen as an input unit, designation of the designated region is performed by the user performing input by bringing a finger in contact with a through image that is displayed on the touch screen. The designated region is set, for example, as a region with a predetermined area centered on a position with which a finger or the like is in contact over the through image.

Further, in a case when an information processing device such as a personal computer is to realize the function as the image processing device 1, for example, the designated region is set as a region that includes a predetermined area centered on a position that is designated by a mouse or the like that is attached to the personal computer. Further, the designated region may be set by designating an arbitrary region on the through image with a mouse or the like. Further, without being limited to a case when the user designates the designated region, the region of the face may be set as the designated region by performing image recognition of the face and the like.

The color space selection unit 3 performs selection of the color space and a switching process (hereinafter referred to as the color space selection process) based on the color information that is detected by the image information obtaining unit 2. Selected information that indicates the color space is supplied to the region specifying unit 4 along with the input image. According to the embodiment of the present technology, any of a YUV color space in which the color is expressed by a luminance signal (Y) and color difference signals (U)

(V), an HSV color space in which the color is expressed by the hue (H), the saturation (S), and the value (brightness) (V), and an HSL (also referred to as HLS, HSI) color space in which the color is expressed by the hue (H), the saturation (S), and the lightness (L) is selected. Details of the color space selection process will be described later. Here, while YUV will be described in the specification, YCbCr is also the same. Here, in the present specification, luminance, value, and lightness will be collectively referred to as luminosity.

Further, in the description below, the range of values of the hue (H) is 0 to 360 (0: red), the range of values of the saturation (S) is 0 to 255 (0: achromatic color, 255: pure color), and the range of values of the luminosity (V) is 0 to 255 (0: dark, 255: light). Furthermore, the range of values of the luminosity signal and the color difference signals (U) (V) is 0 to 255.

The region specifying unit 4 specifies the same color region that is a region with the same color as the color according to the color information from within the input image (color region specified image that is provided for color region specification) based on the color information and the associated information supplied from the image information obtaining unit 2 and the color space selected by the color space selection unit 3 (hereinafter referred to as the region specifying process).

Further, in a case when a plurality of candidates for the same color region (hereinafter referred to as the same color region candidates) within the image are detected, the region specifying unit 4 specifies the same color region by selecting one of the plurality of same color region candidates (hereinafter referred to as the region selection process). Once the same color region is specified, the region specifying unit 4 outputs information that indicates the position, the range, and the like of the same color information to a tracking control unit and the like that controls the tracking action in a capturing device or the like on which the image processing device 1 is installed.

[1-2. Overall Flow of Image Processing]

Figure 2:
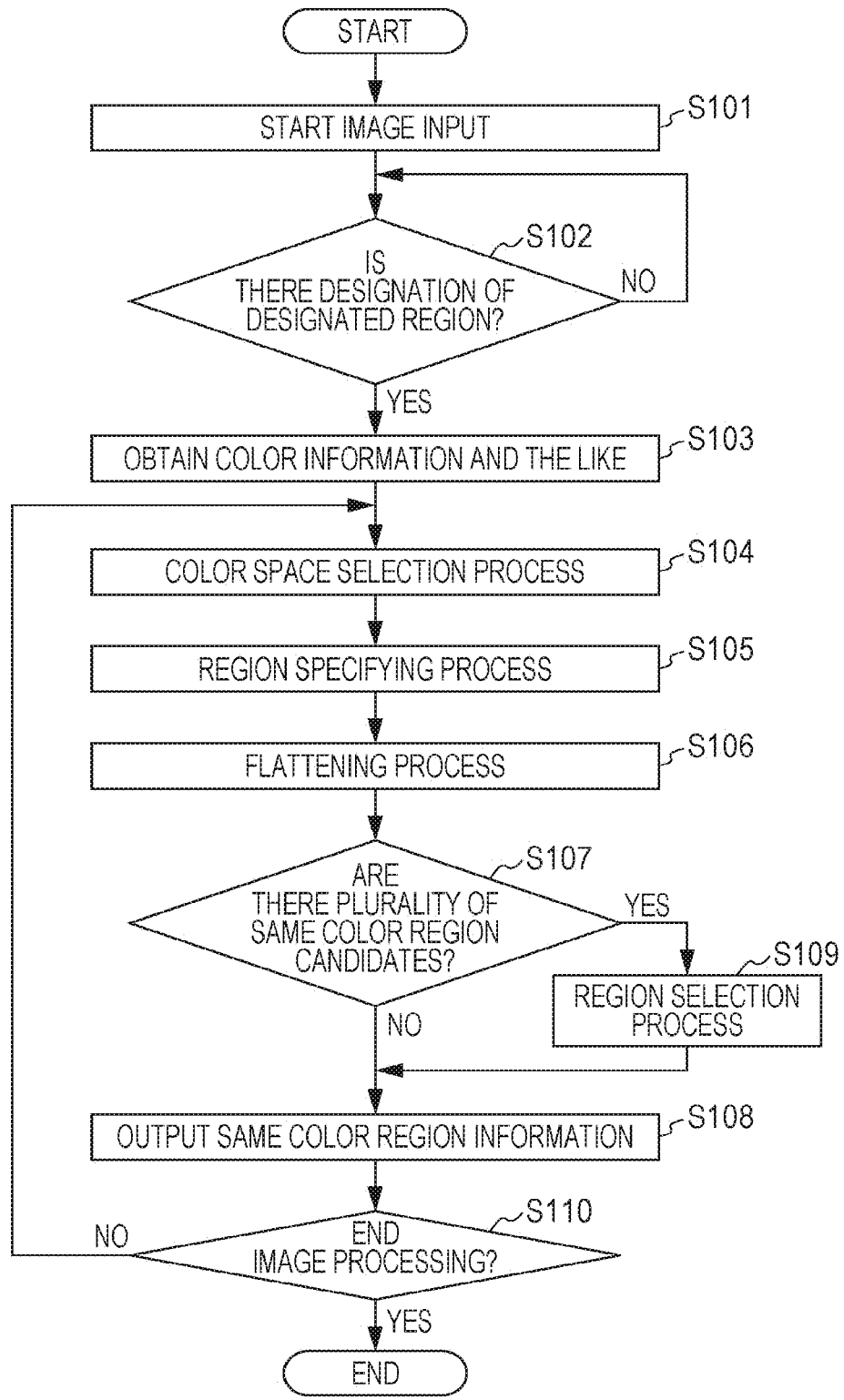
FIG. 2 is a flowchart that illustrates the overall flow of the image processing that is performed by the image processing device.

FIG. 2 is a flowchart that illustrates the overall flow of the image processing that is performed by the image processing device 1 according to an embodiment of the present technology. First, input of an image to the image processing device 1 is started in step S101. While in this example, the input of an image is described as being performed constantly as long as image processing according to the embodiment of the present technology or a capturing process is being performed, the inputting may be only executed when appropriate such as when tracking is executed. Further, image processing is performed at the frequency of every frame or every few frames. The input image is displayed as a through image on a capturing device or the like on which the image processing device 1 is installed. Next, it is determined in step S102 whether or not designation of the designated region is performed. In a case when the designation of the designated region is not performed, the process of step S102 is repeated (No in step S102). In a case when it is determined in step S102 that the designation of the designated region is performed, the process proceeds to step S103 (Yes in step S102). Next, obtaining of the color information and color histograms of the designated region, the color of the entire input image, and the associated information is performed by the image information obtaining unit 2 in step S103.

Next, a color space selection process is performed by the color space selection unit 3 in step S104 based on the color information and the like supplied from the image information obtaining unit 2. As described above, the color space selection process is a process of selecting which color space of a YUV color space, an HSV color space, or an HSL color space is to be used and switching to the selected color space. Details of the color space selection process will be described later based on a separated flowchart.

Next, a region specifying process is performed in step S105 based on the color information obtained by the image information obtaining unit 2 and the color space selected by the color space selection unit 3. The region specifying process first compares the color information and the colors of each of the pixels that configure the input image and detects pixels of the same color as the color according to the color information. Furthermore, a region that is configured by the pixels of the same color as the color according to the color information is specified as the same color region. Here, in a case when there is a plurality of same color regions, obtaining of the associated information (size, position, moving vectors, and the like) and the like of each of the same color regions is also performed. Details of the region specifying process will be described later. Here, although the same color region is specified as a same color region that includes a plurality of pixels in this example, the embodiments of the present technology are also able to be applied in a case when a pixel of the same color is specified.

Next, a flattening process is applied in step S106. However, such a process is not important. Next, it is determined in step S17 whether or not there is a plurality of same color regions. In a case when there is not a plurality of same color regions, the process proceeds to step S108 (No in step S107). On the other hand, in a case when there is a plurality of same color regions, the process proceeds to step S109 (Yes in step S107).

In step S109, the same color region is specified by selecting the closest candidate to the designated region from a plurality of same color region candidates. In a case when specification of the same color region is performed by whether or not the color of each pixel is the same as the color according to the color information, there may be a case when there is a plurality of candidates for a plurality of same color regions. In such a case, the same color region is specified by selecting the closest candidate to the designated region out of the plurality of same color region candidates. Selection from the plurality of same color region candidates is performed by comparing the associated information of the designated region obtained in step S103 and the associated information of each of the same color region candidates.

Next, in step S108, the same color region information that is information that indicates the position, the size, and the like of the specified same color region is output to an external tracking control unit or the like. Furthermore, tracking control and the like are performed by a capturing device and the like on which the image processing device 1 is installed. For example, in a case when the capturing device is capable of a panning and tilting action, a control signal for containing the same color region as the tracking target in the vicinity of approximately the center of the angle of view of the capturing device in an appropriate size is generated and output to an action control unit that governs the panning and tilting actions of the capturing device. By the capturing device performing panning and tilting actions based on the control signal, tracking of the same color region is performed. Further, the zoom action, autofocus, and the like of the capturing device may be controlled using the same color region information.

Furthermore, it is determined in step S110 whether or not the image processing has ended. A case when the image process has ended is, for example, a case when the user instructs the end of image processing to the image processing device 1. Step S104 is returned to in a case when the image processing has not ended, and the image processing is continued by steps S104 to S110 being repeated (No in step S110). On the other hand, in a case when the image processing has ended, the processes illustrated in the flowchart of FIG. 2 are ended (Yes in step S110).

[1-3. Color Space Selection Process]

Figure 3:
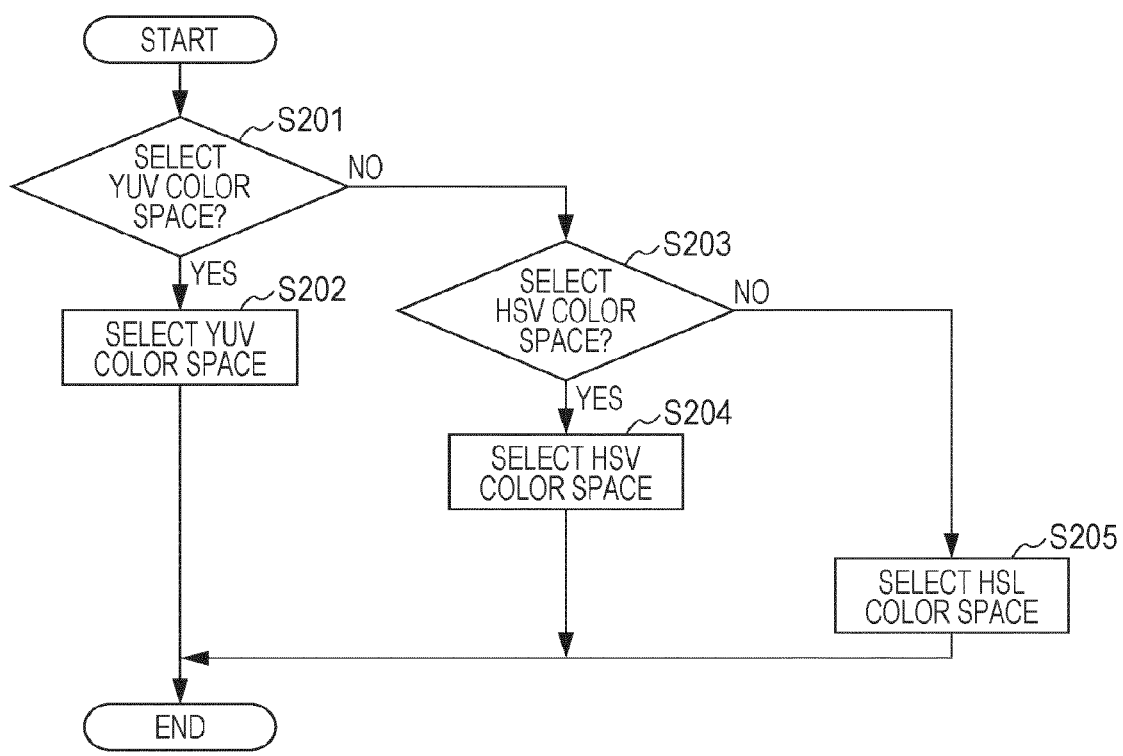
FIG. 3 is a flowchart that illustrates the flow of the color space selection process.

Next, details of the color space selection process of step S104 described above will be described. FIG. 3 is a flowchart that illustrates the flow of the color space selection process. In the color space selection process, whether or not a YUV color space is selected is first determined in step S201. The determination of whether or not the YUV color selection is selected is made based on the comparison result between the saturation that is extracted from the color information and the YUV saturation threshold value and the comparison result between the luminosity that is extracted from the color information and the YUV luminosity threshold value.

For example, the YUV saturation threshold value is set to 110 and the YUV luminosity threshold value is set to 40. Furthermore, it is determined that a color space other than a YUV color space is used in a case when the saturation that is extracted from the color information is equal to or greater than 110 and the luminosity is equal to or greater than 40. On the other hand, it is determined that a YUV color space is used in cases other than when the saturation is equal to or greater than 110 and the luminosity is equal to or greater than 40.

However, specific values of the YUV saturation threshold value and the YUV luminosity threshold value described above are only examples, and values other than such values may be adopted depending on the capturing environment and the like. For example, the YUV saturation threshold value is lowered by approximately 10% or the like in an environment where shadows tend to appear, such as outdoors. The reason is that compared to a YUV color space, an HSV color space has the characteristic of being able to absorb the difference between portions with sunlight and portions without sunlight.

Further, adjusting the YUV saturation threshold value according to the hue that is extracted from the color information is also considered. Specifically, lowering the YUV threshold value by 5% in a case when the hue is red or is close to red, raising the YUV threshold value by 5% in a case when the hue is yellow, green, or similar thereto, and the like are considered. Further, while determination of whether or not a YUV color space is used was made based on the saturation and the luminosity in the description above, without necessarily using the saturation and the luminosity, determination may be made based only on the saturation.

Returning to the description of the flowchart of FIG. 3, in a case when it is determined in step S201 that a YUV color space is used (Yes in step S201), the process proceeds to step S202, the YUV color space is selected and the color space selection information that indicates the selected color space is supplied to the region specifying unit 4 along with the input image. On the other hand, in a case when it is determined in step S201 that a YUV color space is not selected, the process proceeds to step S203 (No in step S201).

Next, it is determined in step S203 whether or not an HSV color space is used. In a case when it is determined in step S203 that an HSV color space is used, the process proceeds to step S204 (Yes in step S203) and an HSV color space is selected. On the other hand, in a case when it is determined in step S203 that an HSV color space is not used, the process proceeds to step S205 (No in step S203) and an HSL color space is selected.

Determination of whether or not an HSV color space is used is performed based on the luminosity of the input image. Specifically, determination is made by whether or not the condition that the average value of the luminosity of the entirety of the input image is equal to or greater than an HSV first luminosity threshold value and the luminosity of a high value out of each luminosity is equal to or greater than an HSV second threshold value is satisfied. In a case when the above condition is not satisfied, an HSV color space is selected as the illuminance of the capturing environment is low. On the other hand, in a case when the above condition is satisfied, an HSL color space is selected as the illuminance of the capturing environment is high.

The HSV first luminosity threshold value is able to be set, for example, to 180. Further, the HSV first luminosity threshold value is able to be set, for example, to 220. Furthermore, in a case when the average value of the luminosity of the entire image is equal to or greater than 180 and the luminosity of the upper 15% is equal to or greater than 220, it is determined that an HSL color space is used in obscurity and an HSV color space is used otherwise.

A case when the luminosity of the entire image is high is in other words a case when "the color is close to a saturated state (color saturation is predicted)". A case when the illuminance of the capturing environment is high, a case when the dynamic range of the capturing element used in the capturing is narrow, and the like are considered as cases when the color is close to a saturated state. However, even if the illuminance of the capturing environment is high, the color is not saturated in a case when the dynamic range is wide, and even if the dynamic range is narrow, the color is not saturated in a case when the illuminance of the capturing environment is low. Therefore, the threshold value that is used in determining whether or not an HSV color space is to be used may be set as appropriate based on the dynamic range of the capturing element.

The reason for performing selection of the HSV color space and the HSL color space according to the luminosity of the entire input image is that an unlimited dynamic range is the premise of an HSV color space while on the other hand, color saturation is built in as a model to an HSL color space. Therefore, for example, by using an HSL color space even in a case when the illuminance of the capturing environment is extremely high such as outdoors at noon in fair weather, it is possible to perform accurate region specification without losing sight of the designated region. The same is also true in a case when a capturing element with a narrow dynamic range with which the color tends to become saturated.

Here, in the setting of the threshold value, it is also possible to take elements of the capturing element into consideration. Specifically, the HSV first luminosity threshold value and the HSV second luminosity threshold value is lowered by approximately 5 to 10% (HSV first luminosity threshold value 170, HSV second luminosity threshold value 205) in a case when the capturing environment is indoors, daytime, and fair weather. The reason is that there is a possibility that the illuminance rises when outdoors during the day in fair weather.

Furthermore, in a case when the weather is rainy or cloudy or during the night (and the screen is dark, that is, the average luminosity is low), The HSV first luminosity threshold value and the HSV second luminosity threshold value are lowered by several percent. It is considered that the reason is that since in environments such as rain, clouds, and night, the illuminance is generally low and it is dark, even if the luminosity changes due to changes in the illuminance, such a change is small. However, in a case when it is night but the screen is light, it is possible to not perform adjustment of the first luminosity threshold value and the HSV second luminosity threshold value (keep the default setting). Not performing adjustment is based on the belief that in a case when the screen is sufficiently light at night, it would be rare for the luminosity to increase any further. Determination of whether the screen is light or dark is able to be performed, for example, based on the average luminosity of the entire image.

Here, determination of whether the capturing environment is indoors or outdoors is able to be performed, for example, based on a third luminosity threshold value set separately from the HSV first luminosity threshold value and the HSV second luminosity threshold value described above. In a case when the average luminosity of the input image is equal to or less than the third luminosity threshold value, it is determined that the capturing environment is dark and that it is indoors, and in a case when the average luminosity is equal to or greater than the third luminosity threshold value, it is determined to be outdoors. Further, in a case when the capturing device used in capturing includes a GPS (Global Positioning System) function, determination is also able to be made based on the positional information obtained by GPS. Further, it is also possible to make a determination taking into consideration the measurement result of the color temperature of the subject.

Further, determination of the time of day such as daytime or nighttime is able to be performed based on a clock function or the like that the capturing device that performs the capturing includes. Further, in a case when the capturing devices used for capturing includes a network connection function in addition to a GPS function, the determination of the weather is able to be performed by obtaining the meteorological information and the like of the current position from a meteorological server (not shown) based on the positional information obtained by the GPS.

Furthermore, the HSV first luminosity threshold value and the HSV second luminosity threshold value may be adjusted according to the gain of the automatic exposure of the capturing device used in capturing. Specifically, since the luminosity of the image does not easily change in a case when the gain of automatic exposure is large, both the HSV first luminosity threshold value and the HSV second luminosity threshold value are raised. Further, in a case when the gain of automatic exposure is small, both the HSV first luminosity threshold value and the HSV second luminosity threshold value are lowered.

Figure 4A:
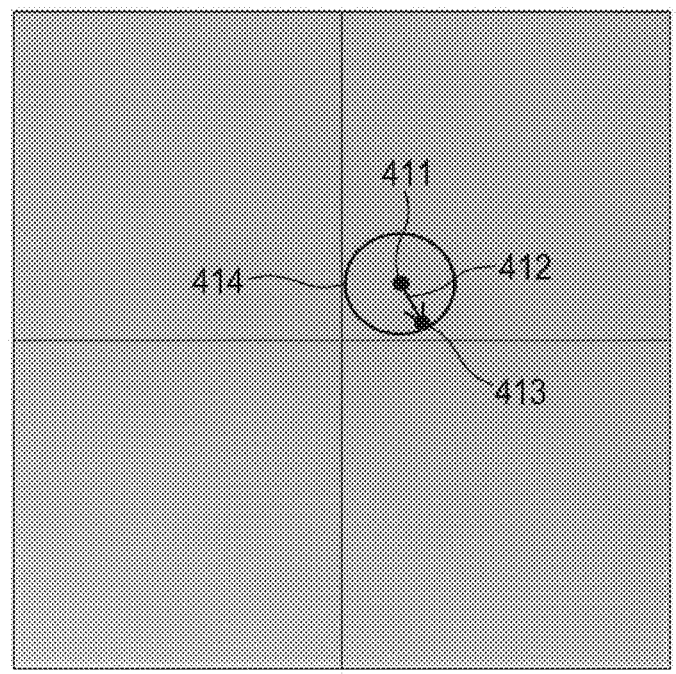
FIGS. 4A and 4B are diagrams that illustrate the characteristics of a color space in a case when the saturation is low.

As described, in the embodiment of the present technology, in a case when the saturation that is evaluated from the color information is equal to or less than a predetermined threshold value, a YUV color space is selected. The reason and advantages will be described with reference to FIGS. 4A and 4B. FIG. 4A illustrates a YUV color space and FIG. 4B illustrates an HSV color space.

With the horizontal axis as the color difference between the luminosity signal and blue components (U) and the vertical axis as the color difference between the luminosity signal and red components (V), a YUV color space is represented using the luminosity signal (Y), U, and V. Further, in an HSV color space, the hue is represented by an angle with a phase angle of 0 to 360 degrees. Further, the saturation is represented by the distance from the center.

A first point 411 in FIG. 4A illustrates a color according to the color information of the designated region. Further, a second point 413 positioned at the distal end of an arrow 412 that extends in the lower right direction from the first point 411 shows a color according to the color information of the designated region changed by a change in the illuminance of the capturing environment (due to a change in the illuminance, for example). Therefore, the length of the arrow indicates the degree of change in the color information due to a change in the illuminance. Furthermore, a circular region 414 with the first point 411 as the approximate center indicates a range of the same color in the YUV color space.

Figure 4B:
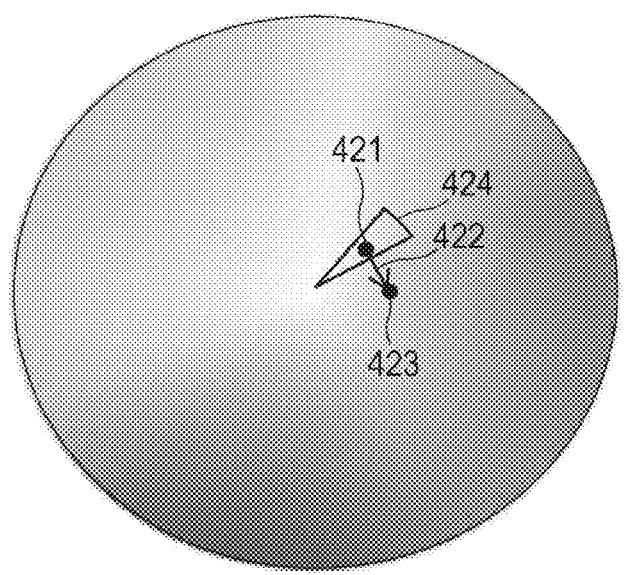

Similarly in FIG. 4B, a first point 421 illustrates a color according to the color information of the designated region. Further, a second point 423 positioned at the distal end of an arrow 422 that extends in the lower right direction from the first point 421 shows a color according to the color information of the designated region changed by a change in the illuminance of the capturing environment (due to a change in the illuminance, for example). Therefore, the length of the arrow indicates the degree of change in the color information due to a change in the illuminance. Furthermore, an approximately fan-shaped region 424 that surrounds the first point 421 indicates a range of the same color in the HSV color space.

FIGS. 4A and 4B are cases when the same designated regions are specified in the same capturing environments. Therefore, the lengths of the arrow 412 in FIG. 4A and the arrow 422 in FIG. 4B are the same, and changes in the color information are the same as changes in the illuminance.

In ranges at which the saturation is low, the hue has a characteristic of having high sensitivity to a change in the illuminance and changes greatly according to small changes in the illuminance. Therefore, as illustrated in FIG. 4B, in an HSV color space that uses a hue, the range of the region 424 that is determined to be the same becomes narrow. Therefore, the second point 423 does not fit within the range of the region 424, and is not determined as the same color. Therefore, within a range where the saturation is low, if an HSV color space is used and the hue is used as the element of region specification, there is a concern that region specification with high precision is not easily performed.

On the other hand, since the color difference has low sensitivity to the degree of the saturation, the color difference has a characteristic that there is little change according to changes in the saturation. Therefore, as illustrated in FIG. 4A, the second point 413 fits within the range of the region 414 that is determined to be the same in an YUV color space that uses the color difference and is determined to be the same color. Therefore, in a case when the saturation of the designated region is low, a region specification with high precision without losing sight of the designated region becomes possible by using a YUV color space.

Figure 5A:
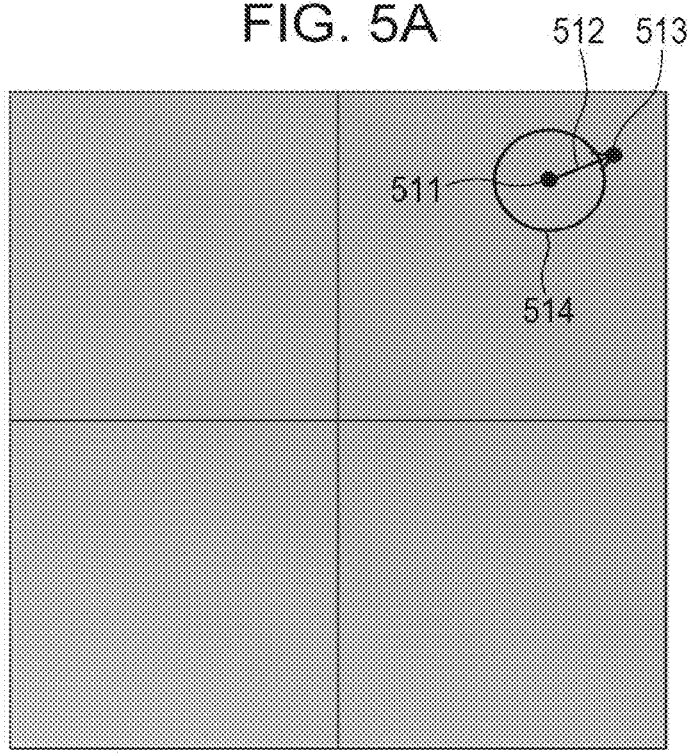
FIGS. 5A and 5B are diagrams that illustrate the characteristics of a color space in a case when the saturation is high.

Next, a case when the saturation that is evaluated from the color information is high will be described. FIG. 5A illustrates a YUV color space and FIG. 5B illustrates an HSV color space.

A first point 511 in FIG. 5A illustrates a color according to the color information of the designated region. Further, a second point 513 positioned at the distal end of an arrow 512 that extends in the lower right direction from the first point 511 shows a color according to the color information of the designated region changed by a change in the illuminance of the capturing environment (due to a change in the illuminance, for example). Furthermore, a circular region 514 with the first point 511 as the approximate center indicates a range of the same color in the YUV color space.

Figure 5B:
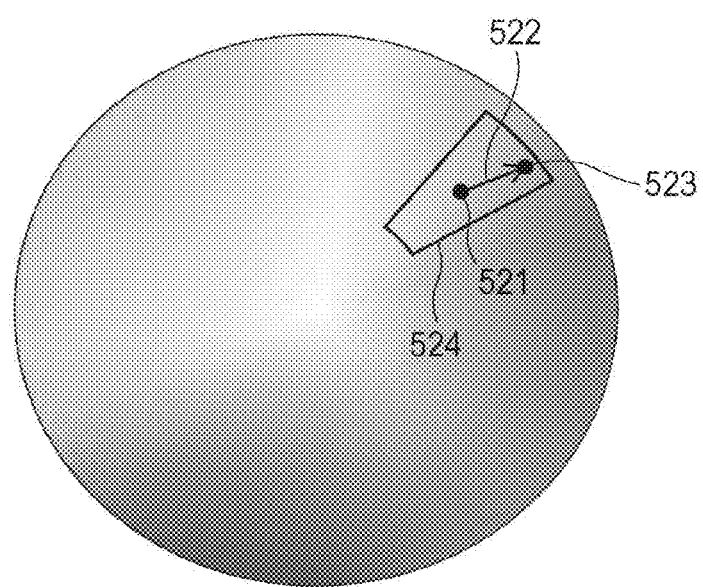

Similarly in FIG. 5B, a first point 521 illustrates a color according to the color information of the designated region. Further, a second point 523 positioned at the distal end of an arrow 522 that extends in the lower right direction from the first point 521 shows a color according to the color information of the designated region changed by a change in the illuminance of the capturing environment (due to a change in the illuminance, for example). Furthermore, an approximately fan-shaped region 524 that surrounds the first point 521 indicates a range of the same color in the HSV color space.

FIGS. 5A and 5B are cases when the same designated regions are specified in the same capturing environments. Therefore, the lengths of the arrow 512 in FIG. 5A and the arrow 522 in FIG. 5B are the same, and changes in the color information are the same as changes in the illuminance.

In ranges at which the saturation is high, the hue has a characteristic of having low sensitivity to a change in the illuminance. Accordingly, in ranges at which the saturation is high, even if the illuminance changes, the hue is able to be used as an element when performing region specification. Therefore, in an HSV color space in which the hue is used, the region 524 that is determined to be the same as illustrated in FIG. 5B is larger than the region 424 of FIG. 4B of a case when the saturation is low. The second point 523 is within the range of the region 524, and is determined to be the same color. Therefore, in a case when the saturation of the color information is high, region specification with high precision is possible by using an HSV color space.

Here, while an HSL color space is omitted from the drawings, similarly to an HSV color space, an HSL color space is also represented by angles in which the hue is a phase angle of between 0 and 360 degrees. Further, the saturation is represented by the distance from the center, and region specification with high precision is possible in ranges at which the saturation is high even when an HSL color space is used.

When the color space selection process described above is performed, in a case when the saturation and the luminosity that are used in the selection of the color space are values near the threshold values, there is a concern that the switching of the color space is repeatedly performed frequently. In order to prevent such repetition, the method described below is able to be adopted. Here, the process below is referred to as a switching frequency suppression process.

In the switching frequency suppression process, at the stage when it is determined that the saturation and the luminosity that are used in the color space selection process are respectively close to the corresponding threshold values, alongside a region specifying process based on the color space that is currently selection a region specifying process using other color spaces is performed at the same time. Furthermore, the results of the region specifying process of each color space are compared and the respective reliability thereof is evaluated. The reliability is able to be defined, for example, based on the number of pixels that are determined to be the same color as the color according to the color information. The color spaces are ranked with the reliability as the highest for the greatest number of pixels that are determined to be the same color as the color of the color information.

Furthermore, in a case when the color space with the highest reliability is not the color space that is currently selected, the color space with the highest reliability is selected regardless of the comparison results with the threshold values. On the other hand, in a case when the color space that is currently selected has the highest reliability, the threshold values that correspond to the color space that is currently selected are brought down, and the frequency at which the switching of the color space is performed is decreased.

For example, a case is assumed when a YUV color space is currently selected and the saturation of the color information that is used to determine whether or not the YUV color space is to be selected is determined to be close to the saturation threshold value. In such a case, other than a region specifying process using the YUV color space, region specifying processes using an HSV color space and an HSL color space are performed at the same time.

Furthermore, the results of the region specifying process of each color space are compared, and the color space selection unit 3 selects the HSV color space if the reliability of the HSV color space is higher than that of the YUV color space or the HSL color space. On the other hand, in a case when the YUV color space that is the color space that is currently selected has the highest reliability, the saturation threshold value and the luminosity threshold value that are the references for switching between the YUV color space and the HSV color space are brought up.

Here, the references for executing a switching frequency suppression process, that is, the determination references of whether or not the saturation and the luminosity are close to the respective corresponding threshold values may be set as appropriate according to the capturing environment. For example, the switching frequency suppression process is executed in a case when the saturation and the luminosity are within a range within ±several % of the corresponding threshold values, or the like.

Further, in order to lower the frequency at which the color space is switched, hysteresis of several % may be provided on the saturation threshold value and the luminosity threshold value that are used in the color space selection process.

The color space selection process is performed as above. The region specifying process is performed based on the color space that is selected in such a manner. Here, in a case when the size, the position, the reliability, and the like of the same color region according to the results of the region specifying process of each color space are different, smoothing may be performed over a wider range of time than normal so that continuity is maintained when switching the color space.

[1-4. Region Specifying Process]

Figure 6:
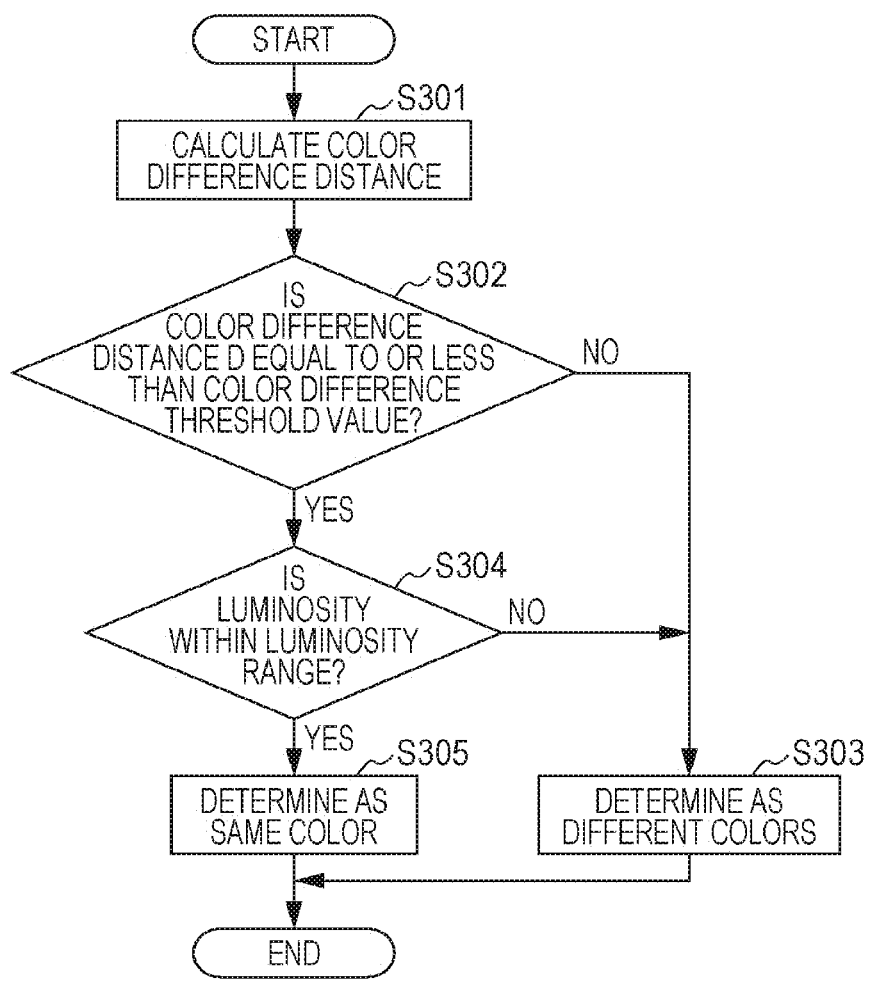
FIG. 6 is a flowchart that illustrates the flow of a region specifying process in a case when a YUV color space is selected.

Next, the region specifying process will be described. First, the region specifying process in a case when a YUV color space is selected by the color space selection process described above will be described. Such a detection process is performed on all of the pixels that configure the input image. However, the detection process may be performed for every few pixels with a predetermined interval therebetween. Further, the detection process may be performed for every region composed of a plurality of pixels. FIG. 6 is a flowchart that illustrates the flow of processes in a case when a YUV color space is selected.

First, the color difference distance between the color according to the color information and the color of a pixel that is the determination target within the input image (hereinafter referred to as the determination target pixel) is calculated in step S301. Since color signal differences U and V are respectively symmetrical parameters, the color difference signals U and V are treated as one pair. A color different distance D is calculated based on Formula 1 below with a pair of the color difference signals of the color according to the color information as (U0, V0) and the color difference signals of the determination target signal within the input image as (U1, V1).

$$V=((U0-V1)2+(U0-V1)2)^{1/2} \quad \text{[Formula 1]}$$

Next, color determination is performed in step S302 by comparing the color difference distance D with a predetermined color difference threshold value. In a case when the color difference distance D is determined to be greater than the color difference threshold value in the color difference determination (No in step S302), the process proceeds to step S303 and it is determined that the color of the determination target pixel is not the same as the color according to the color information.

On the other hand, in a case when it is determined in the color difference determination that the color difference distance D is equal to or less than the color difference threshold value, the process proceeds to step S304 (Yes in step S302). Furthermore, luminosity determination is performed in step S304. In luminosity determination, first, the upper end of a range within which a distribution of equal to or greater than a predetermined value is detected from a histogram relating to the luminosity is an upper side luminosity threshold value, and the lower end of the range is a lower side luminosity threshold value. Further, luminosity determination is performed by determining whether or not the luminosity of the determination target pixel is within the range between the upper side luminosity threshold value and the lower side luminosity threshold value, in other words, by determining whether or not the luminosity is within the luminosity range.

In a case when the luminosity of the determination target pixel is not within the range between the upper side luminosity threshold value and the lower side luminosity threshold value, the process proceeds to step S303 (No in step S304), and it is determined that the color information and the determination target pixel of the input image are not the same color.

On the other hand, in a case when the luminosity of the determination target pixel is within the range between the upper side luminosity threshold value and the lower side luminosity threshold value, the process proceeds to step S305 (Yes in step S304), and it is determined that the color according to the color information and the determination target pixel are the same color. Furthermore, the determination target pixel is detected as a pixel with the same color as the color according to the color information. In such a manner, according to the present embodiment, a determination based on the luminosity is performed in addition to a determination based on the color difference distance. In so doing, it is possible to increase the prevision of the detection process of pixels of the same color. Here, the lower the saturation that is evaluated from the color information, the narrower the range that is configured by the upper side threshold value and the lower side threshold value of the luminosity may be.

In such a manner, the process of detecting pixels with the same color as that of the color information in a case when the YUV color space is selected is performed. Here, while the process is performed in the order of the color difference determination of step S302 and the luminosity determination of step S304 in the flowchart of FIG. 6, since each process is performed independently, the order does not matter. The luminosity determination may be performed first and the color difference determination may be performed thereafter. However, both the color difference determination and the luminosity determination may not necessarily be performed, and the process may be performed based only on the color determination.

The detection process of pixels of the same color in a case when an HSV color space or an HSL color space is selected by the color space selection process described above will be described. The hue (H), the saturation (S), and the luminosity (V or L) that are each of the parameters of the color according to the color information are (H0, S0, V), and the hue (H), the saturation (S), and the luminosity (V or L) of the determination target pixel within the input image are (H1, S1, V1).

Furthermore, the threshold value with respect to the hue is a hue threshold value Hth, the threshold value with respect to the saturation is a saturation threshold value Sth, and the threshold value with respect to the luminosity is a luminosity threshold value Vth. Furthermore, it is determined in a case when Formula 2 below is satisfied that the determination target pixel is the same color as the color of the color information. That is, the determination target pixel is determined to be the same color as the color information in a case when the difference between the hue of the color information and the hue of the determination target pixel is equal to or less than the hue threshold value Hth, the difference in the saturation of the color information and the saturation of the input image is equal to or less than the saturation threshold value Sth, and the difference between the luminosity of the color information and the luminosity of the pixel within the input image is equal to or less than the luminosity threshold value Vth.

$$(abs(H0-H1) \leq Hth) \char`\^ (abs(S0-S1) \leq Sth) \char`\^ (abs(V0-V1) \leq Vth) \quad [\text{Formula 2}]$$

Here, typical values of the threshold value with respect to each of the parameters of the color are approximately 5 for the hue threshold value, approximately 32 for the saturation threshold value, and approximately 64 for the luminosity threshold value. That is, the range at which determination of same color is made which is set by the threshold values is approximately ±5 for the hue, approximately ±32 for the saturation, and approximately ±64 for the luminosity.

Figure 7:
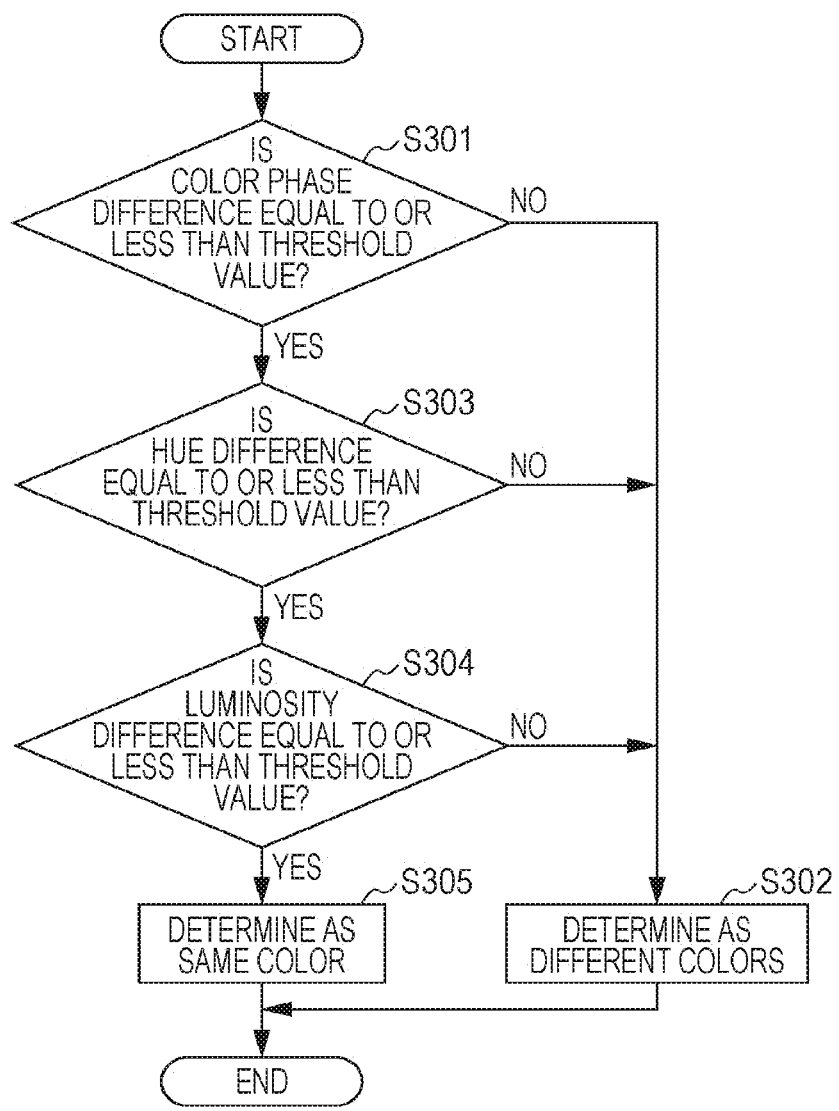
FIG. 7 is a flowchart that illustrates the flow of a region specifying process in a case when an HSV color space or an HSL color space is selected.

FIG. 7 is a flowchart that illustrates the flow of processes in a case when an HSV color space or an HSL color space is selected by the color space selection process. First, it is determined in step S301 whether or not the difference between the hue of the color information and the hue of the determination target pixel within the input image is equal to or less than the hue threshold value.

Here, in order to increase the precision of the process of detecting pixels of the same color, the hue threshold value Hth may be adjusted according to the value of the saturation of the color information. For example, in a case when the saturation of the color information is approximately between 120 and 140, the hue threshold value Hth is increased by approximately 20 to 30%. On the other hand, in a case when the saturation of the color information is high at between approximately 220 and 255, the hue threshold value Hth is decreased by approximately 20 to 30%, and the like.

Figure 8A:
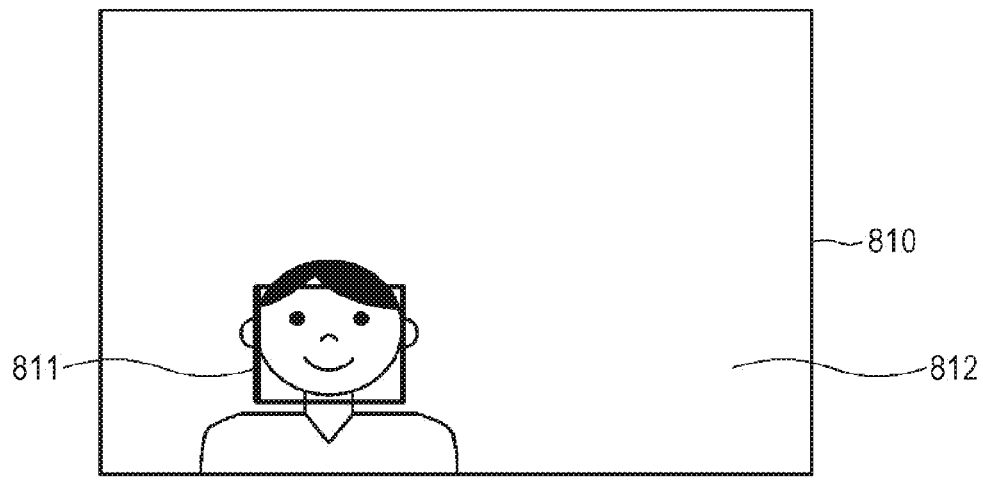
FIGS. 8A and 8B are diagrams for describing the relationship between the color information and the background of an image.
Figure 8B:
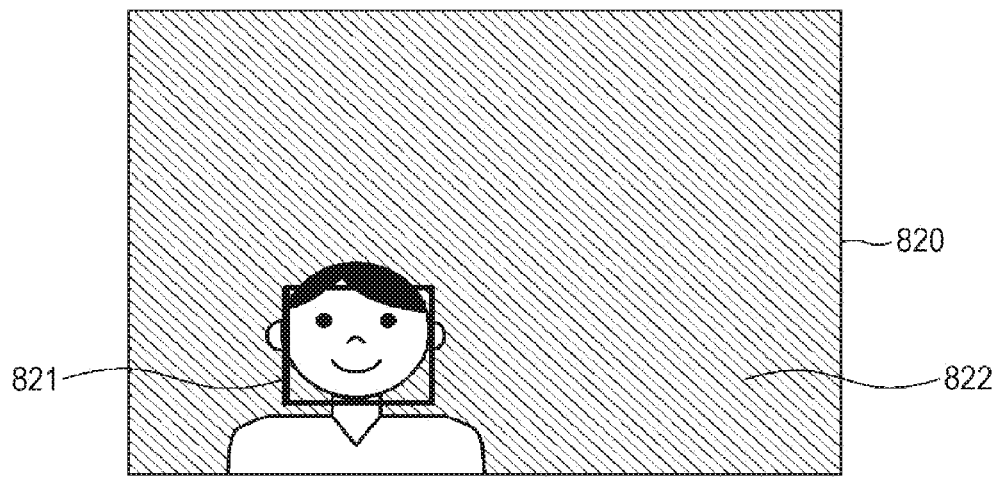

Furthermore, in order to increase the precision of the process of detecting pixels of the same color, the hue threshold value Hth may be adjusted according to the relationship between the color of the region other than the designated region of the input image (hereinafter referred to as the background) and the color information. This point will be described with reference to FIGS. 8A and 8B. FIGS. 8A and 8B are diagrams for illustrating the relationship between the background and the color information of an image. In FIG. 8A is a designated region 811 that is surrounded by a frame within an input image 810. The region other than the designated region 811 is a background 812. Similarly, in FIG. 8B is a designated region 821 that is surrounded by a frame within an input image 820, and the region other than the designated region 821 is a background 822.

The colors of the designated region 811 and the background 812 in FIG. 8A are similar. In such a case, there is a concern that if the hue threshold value Hth is set to a large value, the background may be mistaken for a same color region that has the same color as the designated region 811. Accordingly, in such a case, the hue threshold value Hth is decreased by a factor of 0.8, for example. By decreasing the hue threshold value Hth, it is possible to increase the precision of region specification.

On the other hand, the colors of the designated region 821 and the background 822 in FIG. 8B are not similar. In such a case, even if the hue threshold value Hth is set to a large value, there is no concern of the background being mistaken as a same color region that has the same color as the designated region 821. Accordingly, in such a case, the hue threshold value Hth may be increases by a factor of 1.2 to 2 in a case when a color that is similar to the color information does not exist in the background at all.

Here, whether or not the color information and the color of the background is similar is able to be determined by obtaining the color information and obtaining the color of the entire image by the image information obtaining unit 2 and comparing the color information and the color of the entire image.

Returning to the description of the flowchart of FIG. 7, in a case when it is determined in step S301 that the difference in the hue is equal to or less than the hue threshold value (No in step S301), the process proceeds to step S302 and it is determined that the color according to the color information and the color of the determination target pixel are not the same.

On the other hand, in a case when it is determined in step S301 that the difference in the hue is equal to or less than the hue threshold value Hth (Yes in step S301), the process proceeds to step S303. Next, it is determined in step S303 whether or not the difference between the saturation of the color information and the saturation of the determination target pixel is equal to or less than the saturation threshold value Sth. In a case when it is determined in step S303 that the difference in the saturation is not equal to or less than the saturation threshold value Sth (No in step S303), the process proceeds to step S302 and it is determined that the color according to the color information and the color of the determination target pixel are not the same.

On the other hand, in a case when it is determined in step S303 that the difference in the saturation is equal to or less than the saturation threshold value Sth (Yes in step S303), the process proceeds to step S304. Next, it is determined in step S304 that the difference in the luminosity of the color information and the luminosity of the determination target pixel is equal to or less than the luminosity threshold value Vth.

Here, in order to increase the precision of the process of detecting pixels of the same color, the saturation threshold value Sth and the luminosity threshold value Vth according to the value of the saturation of the color information. For example, in a case when the saturation of the color information is approximately 120 to 140, the saturation threshold value Sth and the luminosity threshold value Vth are decreased by approximately 20 to 30%. On the other hand, in a case when the saturation of the color information is high at approximately 220 to 255, the saturation threshold value Sth and the luminosity threshold value Vth are increased by approximately 20 to 30%, and the like.

Further, the saturation and the luminosity have characteristics of changing according to the luminosity. As a general rule, when the luminosity decreases, the luminosity tends to decrease and the saturation tends to increase. Specifically, if the luminosity decreases by 10 according to a change in the luminosity, the saturation tends to increase by approximately 2 to 4. By setting the saturation threshold value Sth so that such change is absorbed, it is possible to increase the precision of the process of detecting pixels of the same color.

This point will be described with reference to FIG. 9. FIG. 9 illustrates the relationship between the luminosity and the saturation with the vertical axis as the luminosity and the horizontal axis as the saturation. The colored region of FIG. 9 is a same color determined region 911 that is set based on the values of the luminosity V0 and the saturation S0 of the color information and that is determined to be the same color as the color information. In a case when the determination target pixel is a value within the same color determined region 911, it is determined that the saturation of the color information and the saturation of the determination target pixel are the same color.

The same saturation determined region 911 is set as a region with an incline of approximately −3 to −5%, indicating that the range within which it is determined that the saturation is the same changes according to the luminosity. Accordingly, the range within which it is determined that the saturation is the same is set as a range in which the value of the saturation is high in a case when the value of the luminosity is low, and the range within which it is determined that the saturation is the same is set as a range in which the value of the saturation is low in a case when the value of the luminosity is high.

The similarity determination of the saturation will be described in further detail. For example, in a case when the saturation V1 of the determination target pixel is the value illustrated in FIG. 9, the saturation of the determination target pixel is determined to be the same as the saturation of the color information in a case when the saturation S1 of the determination target pixel is a value on a line segment 912 within the same saturation determined region 911. Furthermore, the determination formula of whether or not the saturation of the determination target pixel is on the line segment 912 is able to be represented by Formula 3 below.

$$S'0-Sth \leq S1 \leq S'0+Sth \quad \text{[Formula 3]}$$

In a case when S1 satisfies Formula 3, the saturation S1 of the determination target pixel is determined to be within the same saturation determined region 911 and that the saturation of the color information and the saturation of the determination target pixel are the same. S'0 in Formula 3 represents the middle value of the same saturation determined region after the range within which the saturation is determined to be the same is changed to suit the luminosity of the determination target pixel, and S'0 is represented by Formula 4 below with the correction coefficient as Coeff.

$$S'0 = S0 + \text{Coeff} \cdot (V0 - V1) \quad \text{[Formula 4]}$$

Here, the correction coefficient Coeff corresponds to the inclination of the same saturation determined region 911, and the correction coefficient Coeff is able to be represented by Formula 5 below with the inclination of the same saturation determined region 911 as L.

$$\text{Coeff} = -1/L \approx 0.3 \text{ to } 0.5 \quad \text{[Formula 5]}$$

The precision of the same color detection is able to be increased by changing the conditions by which the saturation is determined to be the same depending on the illuminance.

Returning to the description of the flowchart of FIG. 7, in a case when it is determined in step S304 that the difference in luminosity is not equal to or less than the luminosity threshold value (No in step S304), the process proceeds to step S302 and it is determined that the color according to the color information and the color of the determination target pixel are not the same.

On the other hand, in a case when it is determined in step S304 that the difference in the saturation is equal to or less than the saturation threshold value (Yes in step S303), the process proceeds to step S305, and it is determined that the color according to the color information and the color of the determination target pixel are the same. Here, in the flowchart of FIG. 7, determination is made in the order of the hue, the saturation, and the luminosity. However, the order of determinations is not limited to such an order, and may be any order.

The process in a case when an HSV color space or an HSL color space is selected as described above. According to the embodiments of the present technology, even other than pixels with exactly the same color as the color according to the color information, pixels that satisfy the conditions described above are detected as pixels with the same color. Furthermore, a process of detecting same color region candidates is performed based on the results of the process. The detection of the same color region candidates will be described with reference to FIGS. 10A to 10C.

Figure 10A:
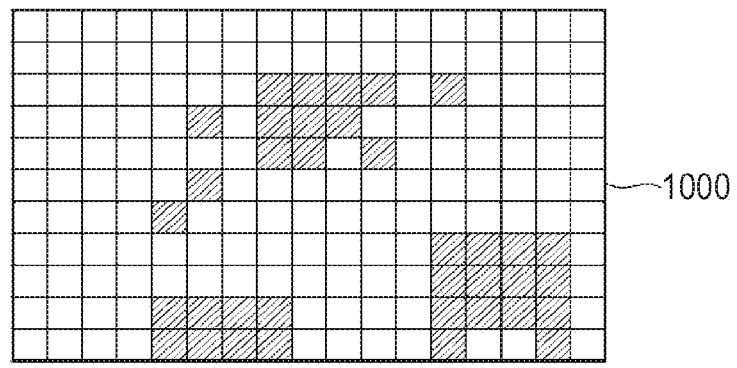
FIGS. 10A to 10C are diagrams for describing the region specifying process.

In the detection of the same color region candidates, first, as illustrated in FIG. 10A, a color map that indicates the distribution of pixels with the same color as the color according to the color information is created on an input image 1000 based on the results of the process described above. In FIG. 10A, the numerous squares within the input image 1000 indicate pixels, and pixels with diagonal lines indicate pixels that have been determined to be the same color as the color according to the color information.

Figure 10B:
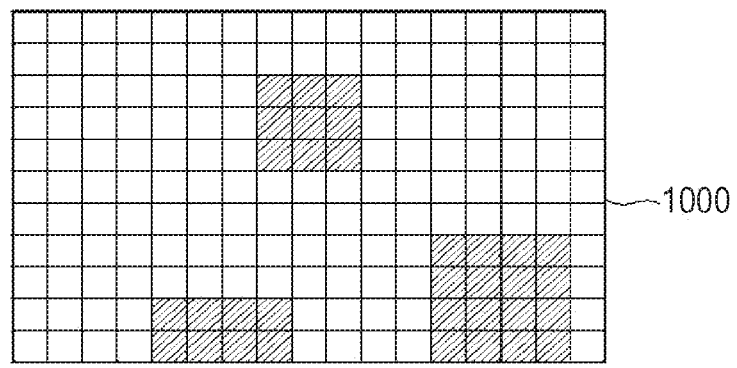
Figure 10C:
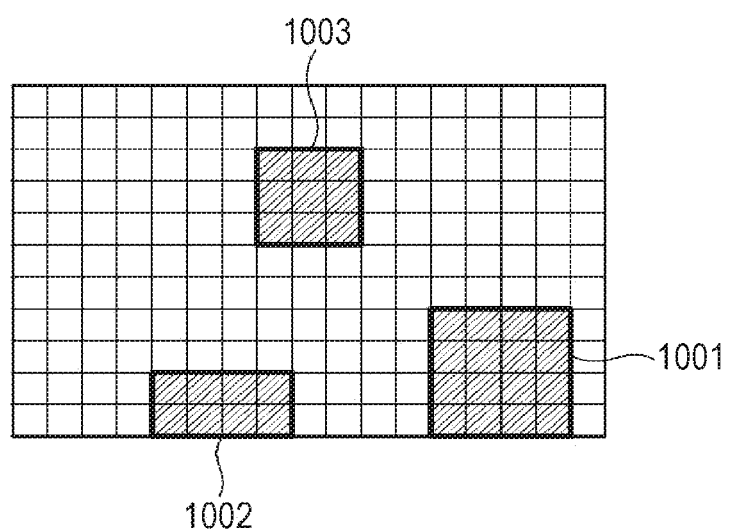

Next, a morphology conversion process is performed. In so doing, as illustrated in FIG. 10B, in a case when the distribution of pixels on the color map is sparse, a region in which a plurality of pixels are continuous is able to be obtained. Furthermore, as illustrated in FIG. 10C, a region that is configured by pixels that are determined to be the same color as the color according to the color information within the color map is detected as a same color region candidate. In FIG. 10C, three same color region candidates, that is, a same color region candidate a 1001, a same color region candidate b 1002, and a same color region candidate c 1003 are obtained. Here, accompanying information for the respective same color region candidates is also obtained.

In a case when region specification is to be performed based on whether or not the color of each pixel of the input image is the same as the color information, there is a case when a plurality of same color regions are detected. In such a case, it is important that the same color region candidate that is closest to the designated region be selected from the plurality of same color region candidates. Therefore, next, the same color region candidate that is closest to the designated region pit of the plurality of same color region candidates is selected. In so doing, the same color region that is evaluated to have the same color as the designated region is able to be specified.

Selection from the plurality of same color region candidates is performed by comparing the accompanying information of the designated region that is obtained in step S103 of FIG. 2 and the accompanying information for each of the same color region candidates.

For example, the size of the designated region and the size of each same color region candidate are compared. Furthermore, the same color region candidate with a size that is closest to the size of the designated region is selected as the same color region. Further, the position of the designated region and the position of each same color region candidate within the input image are compared. Furthermore, the same color region candidate that is closest to the position of the designated region out of each of the same color region candidates is selected as the same color region. Furthermore, the moving vectors of the designated region and each of the same color region candidates are compared, and the same color region candidate for which the moving vector is closest is selected as the same color region.

Figure 11A:
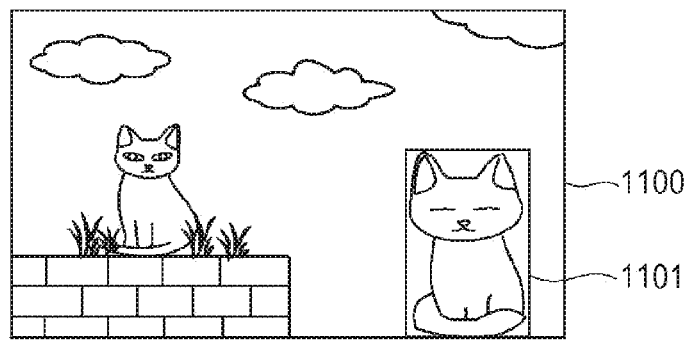
FIGS. 11A to 11C are diagrams for describing a region selection process.
Figure 11B:
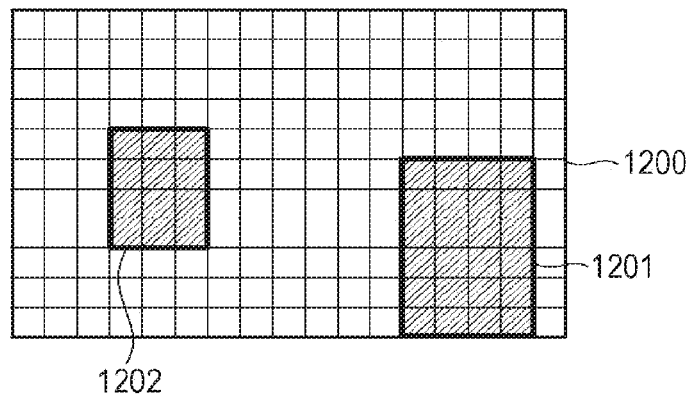
Figure 11C:
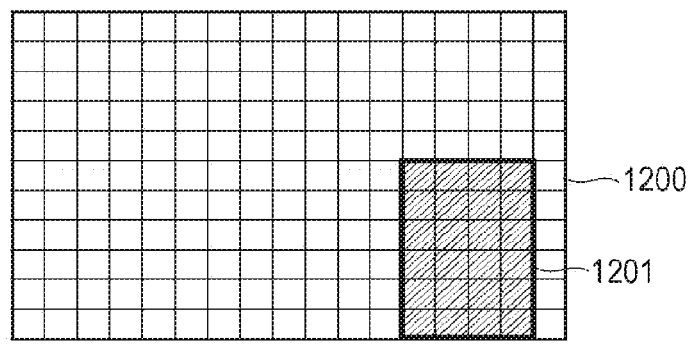

This point will be described based on FIGS. 11A to 11C. two cats are shown in an input image 1100 during the designated region designation illustrated in FIG. 11, and the cat on the right side which is indicated by a frame is designated as a designated region 1101. FIG. 11B illustrates a state in which same color region candidates are detected in an input image 1200 after the designated region designation. As illustrated in FIG. 11, since two cats are shown in the image and the colors of the cats are similar, in FIG. 11B, the positions that equate to both cats are detected as a first same color region candidate 1201 and a second same color region candidate 1202.

Furthermore, the size of the designated region 1101 and the sizes of the first same color region candidate 1201 and the second same color region candidate 1202 during the designation of the designated region are compared. As a result, since the first same color region candidate 1201 is closer to the size of the designated region 1101 than is the second same color region candidate 1202, as illustrated in FIG. 11C, the first same color region candidate 1201 is able to be specified as the same color region. The same results are able to be obtained if the positions of the designated region 1101, the first same color region candidate 1201, and the second same color region candidate 1202 are compared.

However, the selection process from the same color region candidates may be performed using one or a combination of the size, the position, and the moving vector as the accompanying information described above. Furthermore, any other information may be used as long as the information is able to specify one same color region out of a plurality of same color region candidates.

The same color region is able to be specified from the input image in such a manner. Furthermore, same color region information that indicates information such as the position and the size of the specified same color region with which it is possible to ascertain the same color region is output to a tracking control unit or the like on the outside. In so doing, tracking control and the like are performed by a capturing device or the like on which the image processing device 1 is installed.

According to the embodiments of the present technology, it is possible to perform region specification with high precision even in a case when there are large changes in the illuminance. Therefore, the designated region is not lost even in a case when the subject as the designated region moves from the sun to the shade during capturing, in a case when the subject moved from indoors to outdoors, or even in a case when the subject moved from the front of a tunnel to the back, and appropriate region specification is able to be performed.

Here, in the description above, description was given in which the region specifying process was performed for all pixels that configure the input image. However, a search region of a predetermined size including the designated region may be set during designation, and the region specifying process may be performed within the search region. For example, the search region is set to a size that is nine times (three times vertically×three times horizontally) the size of the designated region with the designated region as the approximate center, or the like. By setting the search region in such a manner, since it is no longer important to perform a region specifying process of the entire image, the number of processes taken in region specification is able to be reduced.

[1-5. Configuration of Capturing Device that Includes Image Processing Device]

Figure 12:
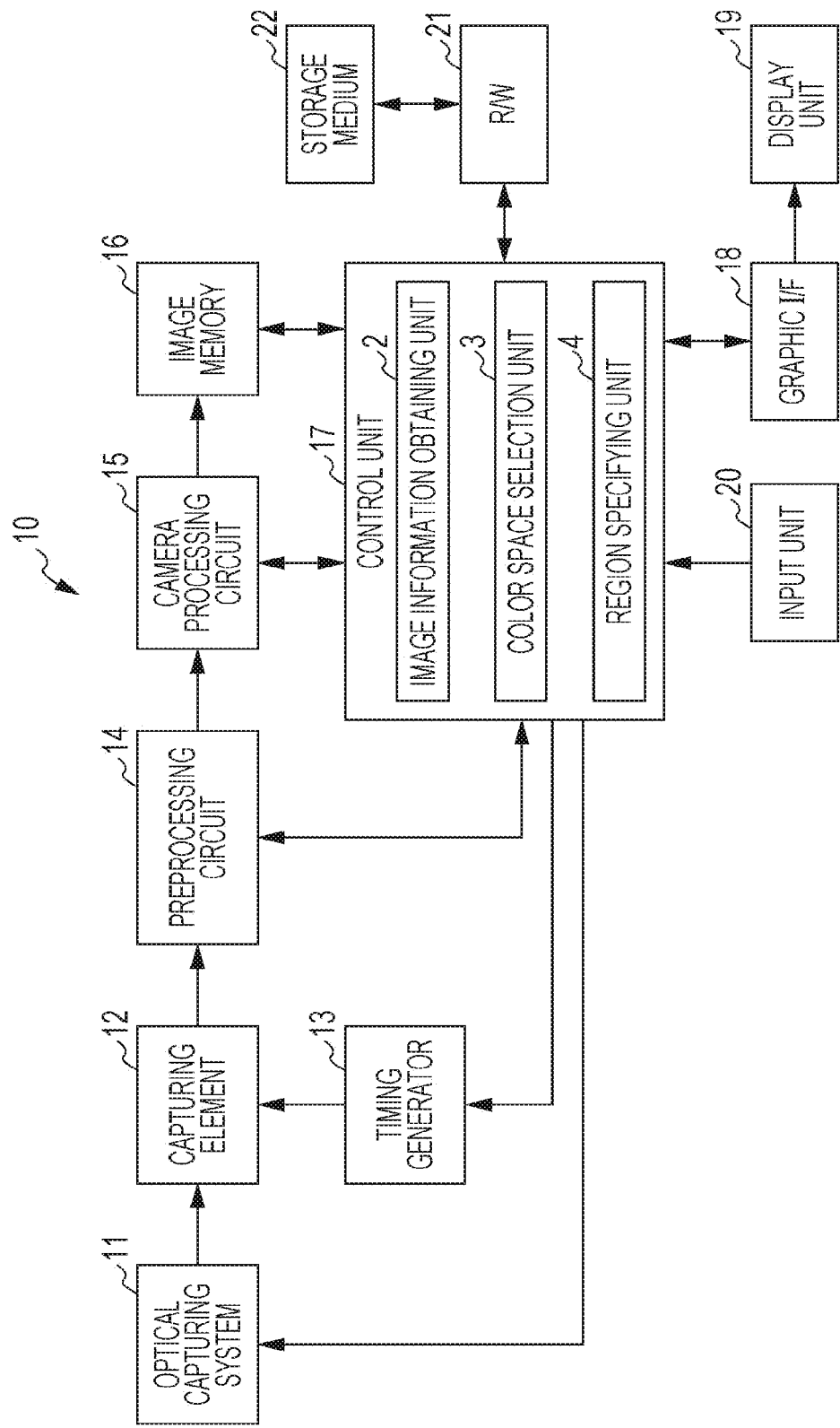
FIG. 12 is a block diagram that illustrates the configuration of a capturing device that includes the image processing device.

An example of a configuration of a capturing device 10 that includes the image processing device 1 described above will be described below. FIG. 12 is a block diagram that illustrates the overall configuration of the capturing device 10.

The capturing device 10 is configured by an optical capturing system 11, a capturing element 12, a timing generator 13, a preprocessing circuit 14, a camera processing circuit 15, an image memory 16, a control unit 17, a graphic I/F (interface) 18, a display unit 19, an input unit 20, a R/W (reader/writer) 21, and a storage medium 22. Of the above, the optical capturing system 11, the timing generator 13, the preprocessing circuit 14, the camera processing circuit 15, the image memory 16, the graphic I/F 18, the input unit 20, and the R/W 21 are connected to the control unit 17. Further, the control unit 17 functions as an image information obtaining unit 2, a color space selection unit 3, and a region specifying unit 4 that configure the image processing device 1.

The optical capturing system 11 is configured by a lens for collecting light from the subject on the capturing element 12, a driving mechanism for performing focus adjustment or zooming by moving the lens, a shutter mechanism, an iris mechanism, and the like. These are driven based on a control signal from the control unit 17 or the tracking control unit 24. The light image of the subject which is obtained via the optical capturing system is imaged on the capturing element 12 as a capturing device.

The capturing element 12 is driven based on a timing signal that is output from the timing generator 13, converts the incident light from the subject into a charge amount by photoelectric conversion, and outputs the charge amount as an analog capturing signal. The analog capturing signal that is output from the capturing element 12 is output to the preprocessing circuit 14. A CCD (Charge Coupled Device), a CMOS (Complementary Metal Oxide Semiconductor), or the like is used as the capturing element 12. The timing generator 13 outputs a timing signal to the capturing element 12 according to the control of the control unit 17.

The preprocessing circuit 14 performs sample holding or the like on the analog capturing signal that is output from the capturing element 12 in order to maintain a favorable S/N (Signal/Noise) ratio by a CDS (Correlated Double Sampling) process. Furthermore, the gain is controlled by an AGC (Auto Gain Control) process, A/D (Analog/Digital) conversion is performed, and a digital image signal is output.

The camera processing circuit 15 performs signal processing such as a white balance adjustment process or a color correction process, a gamma correction process, a Y/C conversion process, and AE (Auto Exposure) process on the image signal from the preprocessing circuit 14.

The image memory 16 is a buffer memory that is configured by a DRAM (Dynamic Random Access Memory), for example, and temporarily stores image data on which predetermined processing has been performed by the preprocessing circuit 14 and the camera processing circuit 15.

The control unit 17 is configured, for example, by a CPU, a RAM, a ROM, and the like. A program or the like that is read and activated by a CPU is stored in a ROM. A RAM is used as a working memory of the CPU. The CPU performs control of the entire capturing device 10 by executing various programs according to the program that is stored in the ROM and issuing commands. Further, by executing predetermined programs, the control unit 17 functions as the image information obtaining unit 2, the color space selection unit 3, and the region specifying unit 4.

The graphic I/F 18 displays an image by generating an image signal for displaying on the display unit 19 from the image signal that is supplied from the control unit 17 and supplying the signal to the display unit 19. The display unit 19 is a display section that is configured, for example, by an LCD (Liquid Crystal Display), a PDP (Plasma Display Panel), an organic EL (Electro Luminescence) panel, or the like. The through image that is being captured, the image that is recorded on the storage medium 22, and the like are displayed on the display unit 19.

The input unit 20 is composed, for example, by a power button for switching the power ON or OFF, a release button for instructing start of recording of the capturing image, an operator for zoom adjustment, a touch screen that is integrally configured with the display unit 19, and the like. When an input is made on the input unit 20, a control signal according to the input is generated and output to the control unit 17. Furthermore, the control unit 17 performs a calculation process or control corresponding to the control signal.

The input unit 20 functions as a region designation unit that designates which subject of the subjects that are displayed on the through image the user designates as the designated region. For example, in a case when the input unit 20 is a touch screen, the designated region is designated by the user bringing a finger into contact with the subject to be the designated region out of the subjects within the through image that is displayed on the touch screen. Once the designated region is designated, a frame may be displayed to surround the subject as the designated region by superimposing the frame on the through image that is displayed on the touch screen. Such a frame may be moved by tracking the subject as the designated region as long as the designated region lasts.

However, the designation of the designated region is not limited to inputs by the user, and a subject that is specified by common personal detection, facial detection, or the like may be designated, and the region of such a subject may become the designated region.

The R/W 21 is an interface to which the storage medium 22 on which image data or the like that is generated by the capturing is recorded is connected. The R/W 21 writes in the data that is supplied from the control unit 17 into the storage medium 22, and furthermore, outputs the data that is read from the storage medium 22 to the control unit 17. The storage medium 22 is a mass storage medium such as, for example, a hard disk, a memory stick (registered product of Sony Corp.), or an SD memory card. The image is saved in a compressed state based on a standard such as, for example, JPEG. Further, EXIF (Exchangeable Image File Format) data that includes additional information such as information relating to the saved image and the capturing date and time is also associated with the image and saved.

The image information obtaining unit 2, the color space selection unit 3, and the region specifying unit 4 are similar to those in the description of the image processing device 1. In the capturing device 10 that includes the image processing device 1, the input image is supplied from the image memory 16 to the image information obtaining unit 2, the color space selection unit 3, and the region specifying unit 4.

The result of the region specifying process by the region specifying unit 4 is able to be used in the tracking control by a capturing device that includes a tracking control unit, a driving unit, and the like, and that is able to automatically track a subject. The same color region information that indicates the result of the region specifying process by the region specifying unit 4 is supplied to the tracking control unit.

The driving unit is configured by a panning and tilting unit that is composed of a rotator and a base and that includes a driving motor (none shown). The capturing device 10 is supported by being arranged or axially supported above the driving unit. The capturing device 10 is able to rotate in a panning direction or a tilting direction by the driving power of a driving motor that the driving unit includes. The driving unit causes the capturing device 10 to pan or tilt by acting according to a control signal from the tracking control unit. In so doing, it becomes possible to track the designated region. The driving unit may be integrally configured with the capturing device 10, or may be configured by a separate device that is able to be detached from the capturing device 10.

The tracking control unit generates a predetermined action control signal to track the same color region based on the same color region information that is supplied from the region specifying unit 4, and supplies the action control signal to the optical capturing system 11, the driving unit, and the like. Furthermore, auto focus, zooming, and the like for keeping the same color region at a predetermined position within the angle of view are performed by the optical capturing system 11, and further, panning and tilting actions and the like are performed by the driving unit. In so doing, tracking of the same color region is performed. Here, the driving unit is not an important configuration of the capturing device 10, and the embodiments of the present technology are able to be applied to a capturing device that does not include a driving unit.

Here, the processing functions of the image processing device 1 and the capturing device 10 described above are able to be realized by a computer. In such a case, a program on which the processing content of the functions that the image processing device 1 and the capturing device 10 are to include is recorded is supplied. Furthermore, by executing such a program by the computer the processing functions described above are realized on a computer. The program on which the processing content is recorded is able to be recorded on a recording medium such as a semiconductor memory which is able to be read by a computer.

In a case when a program is circulated, portable recording media such as, for example, optical discs or semiconductor memories in which the program is recorded are provided or sold. Further, it is also possible to store the program on a server and to provide the program via a network.

A computer that executes programs stores a program that is recorded on a portable recording medium or a program that is transferred from a server, for example, in its own storage device. Furthermore, the computer reads the program from its own storage device, and executes processes according to the program. Here, the computer is also able to directly read the program from the portable recording medium and to execute processes according to the program. Further, the computer is also able to successively execute processes according to the program that is received every time that a program is transferred from a server computer.

2. <Modifications>

While an embodiment of the present technology has been described in detail above, the embodiments of the present technology are not limited to the embodiment described above, and various modifications based on the technical idea of the embodiments of the present technology are possible.

While the region specifying process was performed with the color of the designated region as the reference in the description above, the region specifying process may be performed by combining a feature amount other than the color with the color. For example, SIFT (Scale-Invariant Feature Transform), SURF (Speeded Up Robust Features), Haar-Like, or the like may be used. Further, it is also possible to use a feature amount that is a relative value of the luminosity in terms of time by an optical flow. Furthermore, DepthMap (distance distribution) may be used by using an infrared sensor.

That is, it is possible to use any combination with an image processing engine using a feature amount that ignores the color difference signal such as using a luminosity pattern that is temporally or geometrically relative within the image or using information that is obtained by a completely different sensor.

Further, while an example in which the three choices of a YUV color space, an HSV color space, and an HSL color space are selectively switched has been described, the two choices of a color space with information as the color difference and a color space with information as the hue may be selectively switched.

Further, while a YUV color space has been described, a YCrCb color space may be considered to be the same as a YUV color space.

While a case when the image processing device 1 is applied to a capturing device such as a digital still camera has been described in the embodiment described above, it is possible to apply the embodiments of the present technology to other capturing devices. For example, the embodiments of the present technology are able to be applied to digital video cameras, mobile phones that include a camera function, mobile game consoles that include a camera function, and the like.

Further, the image processing device 1 is also able to be applied to a so-called network camera system that is composed of a network camera, a personal computer that receives an image from the network camera via a network, and the like. In such a case, the reception terminal side may include the functions of the image processing device 1 and transmit the result of the region specifying process to the network camera. Further, the network camera may include the functions of the image processing device 1 and transmit the image that is obtained while tracking the subject as the designated region to the reception terminal.

Further, the embodiments of the present technology are able to be applied to image processing devices other than capturing devices.

Further, while the luminosity and the luminosity have been distinguished in the description in the present specification, it is also possible to substitute the luminosity with the luminosity, and the luminosity may be interpreted as the luminosity.

Here, the embodiments of the present technology are also able to adopt the following configuration.

(1) An image processing device including:
 a color space selection unit that selects a color space based on designated color information; and
 a region specifying unit that specifies a region that includes a color that matches the color that is shown by the color information designated in the color space from a color region specified image that is provided for color region specification.

(2) The image processing device according to (1),
 wherein the color space selection unit selects one of a color space that includes color difference information or a color space that includes hue information.

(3) The image processing device according to (1) or (2),
 wherein the color space selection unit selects a color space that includes hue information in a case when the saturation of the color region specified image is equal to or greater than a threshold value, and selects a color space that color difference information in a case when the saturation is lower than the threshold value.

(4) The image processing device according to (2) or (3),
 wherein a color space that includes the hue information is a YUV color space, and a color space that includes the color difference information is an HSV color space or an HSL color space.

(5) The image processing device according to (1) to (4),
 wherein the color space selection unit selects an HSL color space when a luminosity of the color region specified image is higher than a predetermined value.

(6) The image processing device according to (1) to (5), wherein the region specifying unit specifies at least one pixel as the region.

(7) The image processing device according to (2) to (6), wherein in a case when a color space that includes the color difference information is selected by the color space selection unit, the region specifying unit determines that in a case when a color difference distance between a color difference signal of the designated color information and a color difference signal of the image is greater than a color difference threshold value, the colors are not the same.

(8) The image processing device according to (2) to (7), wherein in a case when a color space that includes the color difference information is selected by the color space selection unit, the region specifying unit determines that in a case when a color difference distance between a color difference signal of the designated color information and a color difference signal of the color region specified image is equal to or less than a color difference threshold value and the luminosity of the image is within a predetermined range based on the luminosity of the color information, the colors are the same.

(9) The image processing device according to (3) to (8), wherein in a case when a color space that includes the color difference information is selected by the color space selection unit, the region specifying unit determines that in a case when a difference between color parameters of the color information and color parameters of the color region specified image is equal to or less than a parameter threshold value, the colors are the same.

(10) The image processing device according to (9), wherein the color parameters are the hue, the saturation, and the luminosity.

(11) The image processing device according to (9) or (10), wherein in a case when the color information is designated based on a color region designated image that is provided for color region designation, the region specifying unit changes the parameter threshold value based on whether or not there is a color that is similar to the color that is shown in a region other than the designated region of the color region designated image as the color information.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a color space selection unit that selects a color space based on designated color information; and
   a region specifying unit that specifies a region that includes a color that matches a color that is shown by the color information designated in the color space from a color region specified image that is provided for color region specification,
   wherein the color space selection unit selects one of a color space that includes color difference information or a color space that includes hue information, and
   wherein the color space selection unit selects a color space that includes hue information in a case when a saturation of the color region specified image is equal to or greater than a threshold value, and selects a color space that includes color difference information in a case when the saturation is lower than the threshold value.

2. The image processing device according to claim 1, wherein a color space that includes the hue information is a YUV color space, and a color space that includes the color difference information is an HSV color space or an HSL color space.

3. The image processing device according to claim 2, wherein the color space selection unit selects an HSL color space when a luminosity of the color region specified image is higher than a threshold value.

4. The image processing device according to claim 1, wherein the region specifying unit specifies at least one pixel as the region.

5. The image processing device according to claim 1, wherein in a case when a color space that includes the color difference information is selected by the color space selection unit, the region specifying unit determines that in a case when a color difference distance between a color difference signal of the designated color information and a color difference signal of the image is greater than a color difference threshold value, the colors are not the same.

6. The image processing device according to claim 5, wherein in a case when a color space that includes the color difference information is selected by the color space selection unit, the region specifying unit determines that in a case when a color difference distance between a color difference signal of the designated color information and a color difference signal of the color region specified image is equal to or less than a color difference threshold value and the luminosity of the image is within a predetermined range based on the luminosity of the color information, the colors are the same.

7. The image processing device according to claim 1, wherein in a case when a color space that includes the hue information is selected by the color space selection unit, the region specifying unit determines that in a case when a difference between color parameters of the color information and color parameters of the color region specified image is equal to or less than a parameter threshold value, the colors are the same.

8. The image processing device according to claim 7, wherein the color parameters are the hue, the saturation, and the luminosity.

9. The image processing device according to claim 7, wherein in a case when the color information is designated based on a color region designated image that is provided for color region designation, the region specifying unit changes the parameter threshold value based on whether or not there is a color that is similar to a color that is shown in a region other than the designated region of the color region designated image as the color information.

10. An image processing method comprising:
    selecting, by use of a color space selection unit, a color space based on designated color information; and
    specifying a region that includes a color that matches a color that is shown by the designated color information in the color space from a color region specified image that is provided for color region specification,
    wherein the selecting selects one of a color space that includes color difference information or a color space that includes hue information, and
    wherein the selecting selects a color space that includes hue information in a case when a saturation of the color region specified image is equal to or greater than a threshold value, and selects a color space that includes color difference information in a case when the saturation is lower than the threshold value.

11. A non-transitory computer readable storage medium having stored thereon a program causing a computer to execute the image processing method comprising:
- selecting a color space based on designated color information; and
- specifying a region that includes a color that matches a color that is shown by the designated color information in the color space from a color region specified image that is provided for color region specification,
- wherein the selecting selects one of a color space that includes color difference information or a color space that includes hue information, and
- wherein the selecting selects a color space that includes hue information in a case when a saturation of the color region specified image is equal to or greater than a threshold value, and selects a color space that includes color difference information in a case when the saturation is lower than the threshold value.

* * * * *